United States Patent
Schäfer

(10) Patent No.: US 8,707,658 B2
(45) Date of Patent: Apr. 29, 2014

(54) RACK-INTEGRATED PACKING STATION

(75) Inventor: Gerhard Schäfer, Neunkirchen (DE)

(73) Assignee: SSI Schafer Noell GmbH Lager- und Systemtechnik, Giebelstadt (DE)

( * ) Notice: Subject to any disclaimer, the term of this patent is extended or adjusted under 35 U.S.C. 154(b) by 791 days.

(21) Appl. No.: 12/275,598

(22) Filed: Nov. 21, 2008

(65) Prior Publication Data

US 2009/0136328 A1  May 28, 2009

Related U.S. Application Data

(63) Continuation of application No. PCT/EP2007/004518, filed on May 22, 2007.

(30) Foreign Application Priority Data

May 24, 2006  (DE) .......................... 10 2006 025 619

(51) Int. Cl.
*B65G 1/137* (2006.01)
*B65G 1/02* (2006.01)

(52) U.S. Cl.
CPC ................................ *B65G 1/1378* (2013.01); *B65G 1/026* (2013.01)
USPC .............. 53/237; 414/267; 414/268; 414/273

(58) Field of Classification Search
CPC ..... B65G 1/026; B65G 1/1373; B65G 1/1378
USPC ............ 53/399, 582, 237; 414/266, 273, 276, 414/286, 807, 268, 274, 267
See application file for complete search history.

(56) References Cited

U.S. PATENT DOCUMENTS

| | | | | |
|---|---|---|---|---|
| 3,516,557 A | * | 6/1970 | Kaplan | 414/273 |
| 3,554,391 A | * | 1/1971 | Goodell | 414/331.05 |
| RE27,152 E | | 7/1971 | Knowles | |
| 3,606,039 A | * | 9/1971 | Weston et al. | 414/283 |

(Continued)

FOREIGN PATENT DOCUMENTS

| | | |
|---|---|---|
| DE | 197 26 593 A1 | 1/1998 |
| DE | 101 05 706 A1 | 9/2002 |

(Continued)

OTHER PUBLICATIONS

German examination report dated Feb. 5, 2010, for DE 102006025619.0, 7 pages, not translated.

(Continued)

*Primary Examiner* — Stephen F Gerrity
(74) *Attorney, Agent, or Firm* — McNeely, Hare & War LLP; Kevin J. McNeely

(57) ABSTRACT

A method and a work station for order-picking and simultaneously packing articles onto a shipping support includes at least one rack which is divided into at least one rack plane respectively comprising a plurality of rack positions for storing load supports, wherein the articles to be picked are stored preferably in or on the load supports in rack positions; at least one vertical lift unit arranged adjacent to a longitudinal side of the rack and being adapted to retrieve load supports from such rack positions being adjacent to the lift unit; and at least a packing station, which is arranged within an immediate area of the lift unit.

16 Claims, 8 Drawing Sheets

(56) References Cited

U.S. PATENT DOCUMENTS

| | | | | |
|---|---|---|---|---|
| 3,622,020 | A | * | 11/1971 | Sarvary .................. 414/279 |
| 3,782,565 | A | * | 1/1974 | Doran et al. ............... 414/274 |
| 4,073,388 | A | * | 2/1978 | Carter .................. 414/796.7 |
| 4,428,708 | A | * | 1/1984 | Burt ...................... 414/275 |
| 4,466,765 | A | * | 8/1984 | Mautino .................. 414/277 |
| 4,538,950 | A | * | 9/1985 | Shiomi et al. ........... 414/222.06 |
| 4,546,901 | A | * | 10/1985 | Buttarazzi ................. 221/10 |
| 4,607,476 | A | * | 8/1986 | Fulton, Jr. ................ 53/399 |
| 4,678,390 | A | * | 7/1987 | Bonneton et al. ............ 414/282 |
| 4,722,653 | A | * | 2/1988 | Williams et al. ......... 414/222.13 |
| 4,813,847 | A | * | 3/1989 | De Vries .................. 414/807 |
| 4,909,697 | A | * | 3/1990 | Bernard et al. .......... 414/331.04 |
| 5,096,355 | A | * | 3/1992 | Schroder ................. 414/273 |
| 5,135,344 | A | * | 8/1992 | Kita et al. ............... 414/273 |
| 5,141,380 | A | * | 8/1992 | Kato et al. .............. 414/273 |
| 5,199,531 | A | * | 4/1993 | Malin .................... 187/224 |
| 5,379,229 | A | * | 1/1995 | Parsons et al. ............ 700/215 |
| 5,450,929 | A | * | 9/1995 | Ohgita et al. ............. 187/244 |
| 5,472,309 | A | * | 12/1995 | Bernard et al. ............ 414/807 |
| 5,511,923 | A | * | 4/1996 | Dunstan ................. 414/139.9 |
| 5,540,532 | A | * | 7/1996 | Carder et al. ............ 414/284 |
| 5,564,890 | A | * | 10/1996 | Knudsen, Jr. ............ 414/802 |
| 5,669,748 | A | * | 9/1997 | Knudsen, Jr. ............ 414/273 |
| 5,779,094 | A | * | 7/1998 | Stingel, Jr. ............... 221/75 |
| 5,927,926 | A | * | 7/1999 | Yagi et al. .............. 414/280 |
| 5,934,413 | A | * | 8/1999 | Konig et al. ............. 186/56 |
| 6,036,812 | A | * | 3/2000 | Williams et al. ........... 156/277 |
| 6,061,607 | A | * | 5/2000 | Bradley et al. ............ 700/216 |
| 6,431,817 | B1 | * | 8/2002 | Simkowski .............. 414/796.9 |
| 6,817,824 | B2 | * | 11/2004 | Winkler .................. 414/273 |
| 6,880,311 | B2 | | 4/2005 | Winkler |
| 6,929,440 | B1 | * | 8/2005 | Grond .................... 414/284 |
| 7,261,509 | B2 | * | 8/2007 | Freudelsperger ........... 414/269 |
| 7,721,508 | B2 | * | 5/2010 | Yuyama et al. ............ 53/249 |
| 2002/0021954 | A1 | * | 2/2002 | Winkler .................. 414/273 |
| 2002/0027742 | A1 | * | 3/2002 | Ostwald et al. ............ 360/92 |
| 2004/0191049 | A1 | | 9/2004 | Winkler .................. 414/791.6 |
| 2004/0253082 | A1 | * | 12/2004 | Mathys et al. ............ 414/280 |
| 2005/0008463 | A1 | * | 1/2005 | Stehr et al. ............... 414/277 |
| 2006/0156694 | A1 | * | 7/2006 | Aubin et al. ............. 53/447 |
| 2006/0259195 | A1 | * | 11/2006 | Eliuk et al. .............. 700/245 |
| 2009/0139188 | A1 | * | 6/2009 | Schafer .................. 53/474 |

FOREIGN PATENT DOCUMENTS

| | | | |
|---|---|---|---|
| DE | 102 00 077 A1 | 12/2002 | |
| DE | 102 43 919 A1 | 4/2004 | |
| DE | 20 2004 010 221 U1 | 9/2004 | |
| EP | 0 493 327 A1 | 7/1992 | |
| EP | 1 099 652 A1 | 5/2001 | |
| JP | 60106701 A * | 6/1985 | ............... B65G 1/00 |
| JP | 04213502 A * | 8/1992 | ............... B65G 1/00 |

OTHER PUBLICATIONS

English Translation of International Preliminary Report on Patentability, for PCT/EP2007/004518, mailed Jan. 20, 2009, 5 pages.

English Translation of Written Opinion of the International Searching Authority, for PCT/EP2007/004518, mailed unknown, 4 pages.

* cited by examiner

RACK-INTEGRATED PACKING STATION

RELATED APPLICATIONS

This is a continuation application of co-pending international patent application PCT/EP2007/004518 filed on May 22, 2007, which claims priority of the German patent application DE 10 2006 025 619 filed on May 24, 2006 which is fully incorporated herewith by reference.

BACKGROUND OF THE INVENTION

The present invention relates to a work station for order-picking and, simultaneously, packing articles onto a shipping support.

The present invention further relates to a method for order-picking and, simultaneously, packing articles from a rack onto a shipping support in order to process an order-picking order.

RELATED PRIOR ART

In the prior art, different order-picking systems and order-picking methods are known.

There exist two basically different principals according to which order-picking is performed.

With one of them the goods to be picked are retrieved by a person or an order picker (manually) from a store, in order to be order-picked into a container or onto a pallet which the order picker has (permanently) with him/her. With this "man-to-goods" principle this process is repeated that often until all articles of an order-picking order are processed. An order-picking order is to be understood as an arrangement of different articles with different numbers, representing exemplarily a customer's order. Further, order-picking vehicles can be used with the "man-to-goods" principle, which are movable within a rack warehouse in a horizontal direction between the racks, i.e. in rack aisles, and in a vertical direction in order to travel the order picker, who sits or stands in a corresponding order-picking stand of the order-picking vehicle, to a corresponding rack position, where the article to be presently picked is stored. With another embodiment of the "man-to-goods" principle, the order picker walks around the racks and picks article from the rack, for example, into a container which he/she carries himself/herself, or onto a pallet which he/she pulls by the aid of a pallet transport device (e.g. lift truck) behind him/her.

It is a drawback of this "man-to-goods" principle that the order picker has to cover long ways which is reflected in a high amount of time needed for processing order-picking orders, and thus in a lower throughput. If the order picker has to walk around the rack, this is unfavorable from an ergonomic point of view. If the order picker carries the container himself/herself into which it is picked, or pushes the same on a roller track, this is ergonomically unfavorable as well, and only few articles can be picked, i.e. an order-picking order has to be divided into suborders under certain circumstances. This, in turn, increases a control involved for processing the order-picking order. The order-picking process happens in an article-oriented manner.

With another order-picking principle the goods to be picked are transported by the order picker. In this instant, this is called the "goods-to-man" principle. The order-picking process happens in an order-oriented manner. The goods are transported to men in accordance with an order to be processed.

With the "goods-to-man" principle the articles to be picked are kept preferably in containers, on trays, pallets or similar load supports within a warehouse. Such containers are also called storage containers. The order-picking process happens spatially separated from the warehouse at so-called order-picking stations. Articles stored within the storage containers are transported via a conveyor technique, such as motor-operated roller tracks, belt conveyors, hanging conveyors, etc., to the order-picking station. An order picker sits or stands at the order-picking station, and waits for the storage containers, in order to remove articles to be picked and to put the removed articles, for example, into order containers. Then, a completely order-picked container can be transported over another conveyor technique either to a spatially remotely located packing station and subsequently to a shipping station, or directly to a shipping station. The order containers are then transported from the shipping station, for example, by means of cars or trucks to the associated customer, i.e. to the customer.

The principle "goods-to man" is particularly characterized by its ergonomic aspects. An order picker almost does not need to move in order to be able to process an order-picking order. A high throughput can be achieved by means of the utilized conveyor technique. Warehouses can be built spatially cramped since the order picker does not have to drive or walk through the individual rack aisles any longer. Storing and retrieving processes can be automated.

With this order-picking principle, however, higher investment costs involved are disadvantageous. The investment costs are, among other things, determined by the extent of the utilized conveyor technique. The more conveyor technique is used the more expensive the costs for the order-picking system will be. The more conveyor technique is utilized, the more space will be required for the assembly of the conveyor technique.

Further, the control involved for the processing of an order-picking order is higher. The delivery of a storage container to an order-picking station must happen "synchronously" relative to the delivery of an order container. Here, synchronous means that a storage container has to be transported temporarily in an exact manner at the right time to the correct order-picking station which can be expensive and complex if a complex storage container conveyor is used. Similar arguments apply with respect to the subsequent transport of the order container to the order-picking station and/or shipping station.

With bigger and more complex warehouses, again and again traffic jams can occur in the material flow, the jams changing the calculated cycle times (storage container synchronous to order container). Differently long ways (storage positions) of the articles have to be taken into account as far as the material flow optimization is concerned. Often, the sequence and the sequencing of the containers (material flow) affect negatively an optimized travel path of rack feeders. Therefore, a batch is usually expanded. In logistics, a batch is to be understood as a collection of several order-picking orders to form a sequenced amount, or list, of orders. In this connection, generally orders, which are collected in a batch, are moved through without interruption by means of an operator's entry. Therefore, all data required for carrying out the order have to be already present before the processing starts. An expansion of the batch requires, however, an additional sequencing and additional conveyor technique, which is a drawback. Also, sequencing buffers have to be incorporated in front of the order-picking stations, resulting, in turn, in a more complex system in total.

SUMMARY OF THE INVENTION

Therefore, it is an object of the present invention to provide an enhanced work station which satisfies highest ergonomic requirements, allows greater order-picking efficiencies, reduces the planning effort as well as minimizes the investment costs.

This object is achieved by a work station for order-picking and, simultaneously, packing articles onto a shipping support, wherein the work station comprises: at least a rack, which is divided at least into one rack plane each having a plurality of rack positions for storing load supports, wherein the articles to be picked are preferably stored in or on the load supports in the rack positions; at least a vertical lift unit adjacently arranged to a longitudinal side of the rack and being adapted to retrieve load supports from such rack positions which are adjacent to the lift unit; and at least a packing station which is arranged in an immediate area of the lift unit.

The work station according to the present invention is also integrated into the storage rack. Thereby, a conveyor for transporting, for example, storage containers to the order-picking station is omitted where, in the prior art, the articles to be order-picked are picked, i.e. arranged. According to the present invention, the articles to be picked are immediately packed onto a shipping load as well, such as a Europool pallet (EuroPallet, CEN). Thus, beside the storage container conveyor, also the order container conveyor can be omitted, which is used for transporting order-picked order containers to a packing station. Consequently, the investment costs are reduced due to the reduction of installed conveyor technique.

Since the packing station is arranged in the immediate area of the lift unit, i.e. within a narrowly limited space which can be traversed by the order picker with only some few steps, the concept of the order-picking system can save enormously much space. This space saving is based substantially on the omission of the corresponding conveyor techniques as well as the separate order-picking stations. Also, separate packing stations are omitted.

According to a preferred embodiment the work station comprises a device for presenting the supports, which are arranged such that load supports from the lift units can be transferred to the device for presenting the load supports.

The device for presenting the load supports is provided for ergonomic reasons as well as work safety reasons, and facilitates, for the order picker, the picking of articles to be order-picked from load supports. In order to allow automated handing over of load supports from the lift unit to the device for presenting the load supports, particularly without having to provide a conveyor for that purpose, the lift unit is preferably adjacent directly to the device for presenting the load supports. However, the order picker does not have direct contact with the, preferably automated, lift unit, resulting in a safety increase.

Further, it is preferred if the device for presenting the load support is integrated into a frame of a rack type, wherein the frame preferably comprises additional rack positions for storing load supports above and/or beneath the device for presenting.

On this other (additional) rack positions can be stored such load supports which contain articles required very often in order to process an order-picking order (usually designated "A" article, fast mover or fast-moving items). The paths between the other rack positions and the packing station are very short which is reflected in a short transportation time to the packing station, thereby allowing an increase of the throughput. Alternatively, empty shipping supports can be stored on the additional rack positions, wherein an empty shipping support can be transported via the lift unit to the packing station, if an order-picking order is completed, in order to allow processing of the next order-picking order.

Basically, the articles are always located in the area of the racks, i.e. do not leave the rack as it would be the case if a conveyor were used which, for example, transports storage containers to an order-picking station. Traffic jams on the conveyor do not exist. At any time, the load support can be accessed (in terms of availability), even if the load support is already on its way (through the rack) to the packing station.

The sequence by which the orders are processed can be changed in a fast and flexible manner (rush order, late order, etc.).

In accordance with a particular embodiment of the invention the device for presenting the load supports includes means for tilting the same, thereby allowing the device for presenting the load supports to be tilted towards the packing station.

This measure is provided for ergonomic reasons. An order picker merely has to draw articles, which are to be picked, to the shipping support, wherein the gravity force acts in an assisting manner. For this purpose, preferably a shifting mechanism is provided at the frame, is operated by the order picker, and assists shifting of support loads (articles) to the packing station by means of an assist force.

Besides this, it is advantageous if the lift unit comprises at least one lift being movable in a vertical direction, which includes one or more load suspension means for retrieving a load support from a rack position and for handing over a load support to a rack position, wherein the packing station abuts on the lift.

The lift unit comprises at least one lift for delivering load supports to the packing station. In this connection, the lift comprises load receiving means by which the storing and retrieving of load supports can be conducted in an automated manner. The lift and the packing station are preferably arranged to each other such that an additional conveyor technique for transporting load supports between these units is not required.

Preferably, each lift unit has at least two separate lifts being movable in a vertical direction.

Due to the provision of two separately controllable lifts the number of single cycles, i.e. exchanges of the load support between different units of the order-picking system, can be increased. While the one lift delivers load supports towards the packing station, the other lift can already retrieve a new load support from the rack. Thereby, the exchange time is shortened, and the order-picking efficiency is increased. Thus, an order picker does not need to wait for an exchange of load supports, and hence can work continuously.

In accordance with a preferred embodiment the packing station is arranged in an area between two neighboring devices for presenting load supports, each of which is assigned to another one of the lifts.

Thereby, the space requirement is additionally minimized. The packing station, the lift and the device for presenting load supports are arranged in a compact manner within the immediate area of the lift unit. The order picker does not need to walk, in order to pick. This, in turn, increases the ergonomics. Articles and load supports, respectively, do not need to be lifted, but pulled or pushed.

In accordance with an advantageous embodiment the work station comprises an additional rack also having a laterally arranged additional lift unit, wherein the additional rack is arranged oppositely to the rack so that the packing station is located in the immediate area of both, the lift unit of the rack and also of the additional lift unit of the additional rack.

Due to this arrangement the packing station can be arranged centrally within the rack aisle, wherein the load support supply of the packing station happens from two racks. Also, an additional conveyor technique for the delivery of articles to be picked is not required. An article assortment, from which can be chosen, can correspondingly be enlarged whereas the dynamics is maintained.

Preferably, the packing station comprises a frame, a bucket, a guidance or similar for assisting in a packing process.

The frame prevents that articles already packed onto a shipping support (laterally) get out of place. Particularly, at least one of the sides of the frame is formed movably, e.g. can be hinged or formed as a roller blind so that, there, the shipping support is freely accessible for the order picker. The order picker can access from different sides. Also, unwieldy units can be packed in an easy manner.

In accordance with another embodiment the packing station comprises a lifting device for lifting shipping supports to an operational level and for lowering the same to a shipping level.

If a lot of articles have to be picked onto the shipping support, this results in a high stack of articles on the shipping support. For allowing the order picker to work in almost one and the same (serving) height, preferably in the ergonomically most favorable height, the shipping support is lowered in a layer-wise manner, respectively in a plane-wise manner, as soon as a layer of articles is packed on the shipping support. A conveyor is preferably arranged on the shipping level for transporting completely packed shipping supports. The area requirement is thus reduced, since different component of the order-picking system are arranged in different planes.

In accordance with a preferred embodiment the packing station is arranged on a predetermined level, which preferably is arranged in the height of one of the rack planes.

This arrangement allows an assembly including several floors. Several work stations can be arranged both side-by-side and also one beneath another, wherein the articles are supplied from one and the same rack and, with a rack assembly consisting of two racks arranged on top of each other, from one and the same lift(s) or one and the same lift unit(s).

Additionally, it is advantageous if the packing station is coupled to the lift unit by means of a conveyor.

It can occur that particularly fragile articles are to be picked, which cannot be handled by an order picker. Similar applies for particularly heavy articles. In these instances, a short piece of conveyor technique is provided between the lift unit and the packing station for allowing the corresponding transfer.

Particularly, the shipping support is a pallet, preferably a EuroPallet.

Pallets are standard transport supports onto which, particularly many, articles can be stacked in a considerable height.

In accordance with another embodiment of the invention the packing station further comprises a wrapping device for wrapping articles packed onto the shipping support for securing the same against getting out of place, particularly using a foil in a circumferential direction.

Preferably, a shipping support conveyor technique is provided for transporting completely picked shipping supports.

In accordance with another aspect of the present invention a method for order-picking and, simultaneously, packing articles from a rack onto a shipping support in accordance with an order-picking order is proposed, wherein the rack is divided at least into one rack plane, wherein each rack plane has a plurality of rack position for storing load supports in or on which the articles are stored, the method comprising the following steps: transporting load supports, which are assigned to the order-picking order, from the rack positions being adjacent to a lateral vertical lift unit, by means of the lift unit to the packing station, which is arranged in an immediate area of the lift unit; and removing an article to be picked from the load support and packing onto a shipping support provided in the packing station.

The method further comprises the steps: retrieving the load support from an adjacent rack position by using a load suspension device of the lift unit; and delivering the retrieved load support with the load suspension device to the packing station.

Preferably, the load supports are delivered to a device for presenting load supports, and then are presented.

Particularly, it is advantageous, if the step of presenting includes lowering the device for presenting load supports towards the packing station.

Additionally, it is preferred, if the shipping support is lowered when a packing layer is completely packed with articles to be picked, wherein the lowering happens about the height of a packing layer.

Preferably, the lowered packing layer is wrapped by a securing means, particularly a foil.

In accordance with a preferred embodiment of the method in accordance with the present invention an empty shipping support is delivered to the packing station by means of a shipping support conveyor track, which can also be used for transporting completely picked and packed shipping supports, or empty shipping supports are delivered from the rack to the packing station by means of the lift unit.

Additionally, the packing can be performed manually by an order picker, or in an automated manner by a robot, without the need of covering long distances.

In accordance with another embodiment load supports including articles to be picked are transported from several racks, particularly simultaneously, to the packing station for being packed onto the shipping support contemporarily, preferably simultaneously, wherein the lift units of the racks all are arranged in the immediate area of the packing station.

BRIEF DESCRIPTION OF THE DRAWINGS

It is clear that the above explained and hereinafter still to be explained features cannot only be used in the respectively given combination but also in other combinations or on their own, without departing from the scope of the present invention.

Embodiments of the invention are depicted in the drawings and will be hereinafter explained in more detail in the description.

DESCRIPTION OF PREFERRED EMBODIMENTS

Figure 1:
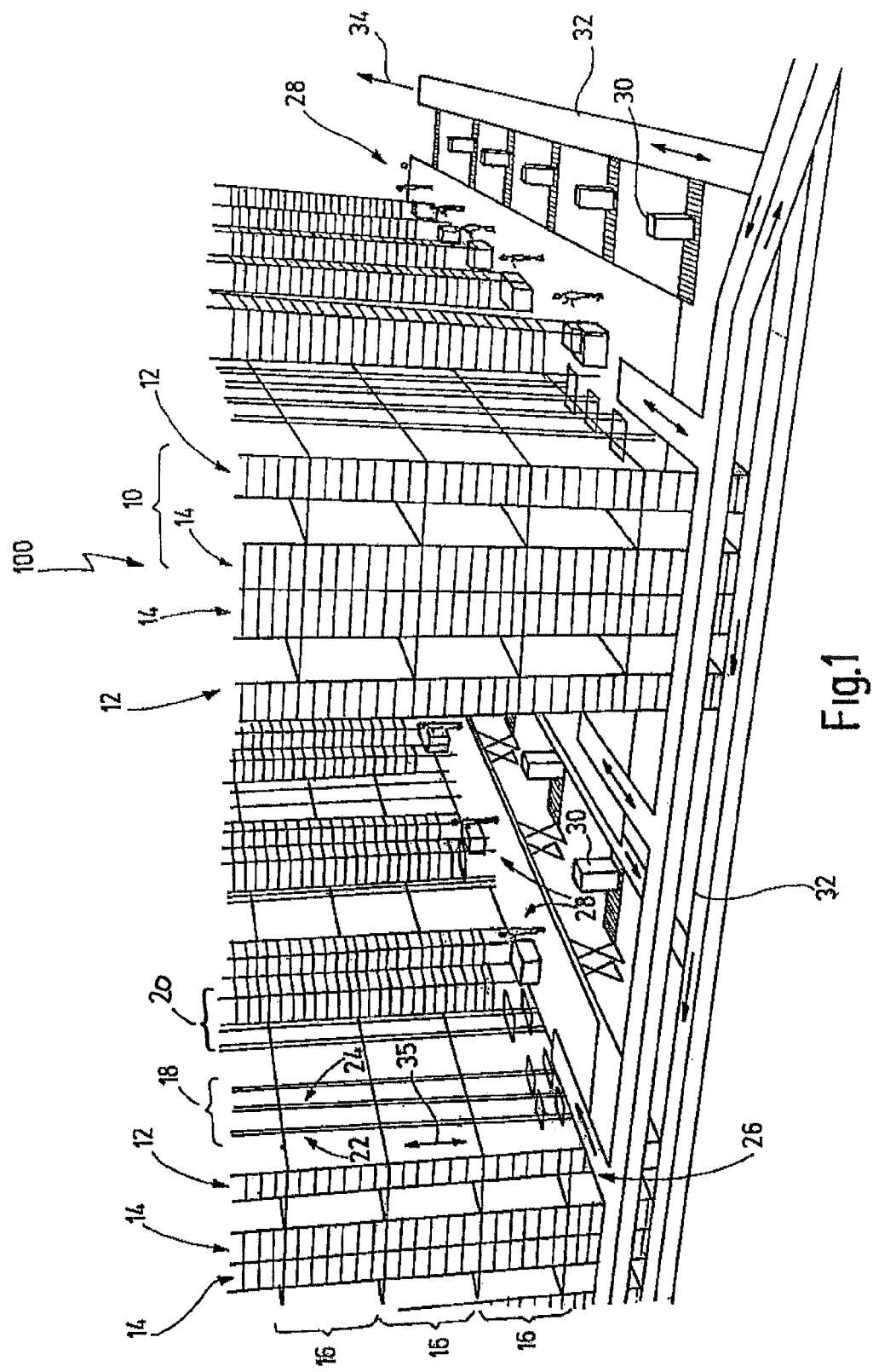
FIG. 1 shows a schematic perspective view of an order-picking system equipped with several work stations in accordance with the present invention.

Hereinafter, identical elements will be designated by identical reference numerals.

With reference to FIG. 1 the utilization of the present invention in an order-picking system 100 will be explained. The invention can be particularly used in the field of food retailing where goods are ordered on pallets or in roller containers by branches and are delivered thereto.

The order-picking system 100 of FIG. 1 comprises several rack units 10 each of which preferably being formed of a first rack 12 and a second rack 14. The rack units particularly comprise several rack planes 16. The rack units 10 of FIG. 1 respectively comprise five rack planes 16 arranged on top of each other. Respectively two rack units are here arranged back to back and thus form a rack block. It is clear that rack units can also be formed of single racks 12, 14 only. The same applies with respect to the rack units.

The rack planes 16 here comprise a plurality of rack rows arranged on top of each other, which, in turn, are formed of a plurality of rack positions arranged side-by-side. The rack planes of FIG. 1 include exemplarily six rack rows. Each rack row comprises, for example, 100 to 200 rack positions (not shown) arranged side-by-side.

In each rack plane a so-called rack aisle is formed in an interspace between the first rack 12 and the second rack 14, within which at least one warehouse machine such as a rack feeder ("RF") can be moved, preferably simultaneously, in both a horizontal longitudinal direction and a vertical direction. In case of a single rack the RF can also be coupled to the exterior side of the rack mechanically. The warehouse machines are provided with corresponding load suspension devices ("LSD") by which load supports can be retrieved from rack positions and delivered to rack positions. Each warehouse machine can be provided with several LSD.

The principle design of such a rack warehouse is described in the parallel patent application entitled "Rack Warehouse and Order-picking Method" which was filed by the applicant on Nov. 21, 2008 as U.S. patent application Ser. No. 12/275,582 and the content of which is incorporated by reference hereto.

Further, a first lift unit 18 as well as a second lift unit 20 is depicted with the left half of the rack unit as depicted in FIG. 1, each being is provided with at least a first lift 22 and, preferably, with a second lift 24, respectively having one or more suspension devices. The first lift unit 18 can be used for storing goods into the racks 12, 14, wherein the first lift unit 18 is preferably connected to a goods receipt conveyor technique 26. The goods receipt conveyor technique 26, for example, can be a (motor-operated) roller conveyor track or an endless traveling belt conveyor which is operated in the direction of the black arrows depicted on the conveyor technique. The conveyor technique 26 supplies articles, which are to be stored, directly or on load supports for storing purposes by means of the first lift unit 18 into the rack unit 10. Load supports are to be understood hereinafter as pallets, trays, conveyors or similar.

Like the first lift unit 18, the second lift unit 20 is arranged along an exterior longitudinal side of the rack block as well. The second lift unit 20 serves for retrieving articles from the racks 12, 14. The lift unit 20 directly abuts on the rack 12 for allowing retrieval of a load support from an adjacent rack position (transfer rack position). The LSD of the corresponding lift, for that purpose, engages either beneath the load support or a front side of the load support, and lifts or pulls the load support onto the LSD. The adjacent rack positions represent transfer rack positions. The transfer rack positions are supplied by means of warehouse machines which can travel in the aisles. The warehouse machine travels in the horizontal and vertical direction along the aisle for retrieving, in accordance with an order-picking order, associated load supports from corresponding rack positions and for delivering the same to transfer rack positions (and vice versa). The lift unit 20 retrieves the load support provided in the transfer rack position, and transports the same in the vertical direction to a work station 28.

In FIG. 1, a plurality of work stations 28 in accordance with the present invention is shown for each rack block. In FIG. 1, the work stations 28 are arranged side-by-side on the exterior sides of the rack blocks. Alternatively, the work stations can also be arranged in several planes on top of each other, wherein optionally one or more work stations are arranged side-by-side. Further, the two rack blocks shown in FIG. 1 can be arranged to each other such close that work stations 28 of the first rack block and the second rack block are directly arranged oppositely to each other.

The work stations 28 are also integrated into the racks 12. Spatial areas are comprised within which, for example, order pickers can work during the picking and packing.

Further, (completely picked) shipping supports 30, here exemplarily pallets, are shown in FIG. 1. The shipping supports 30 here are transported at a level of the lowermost rack plane 16 by means of a shipping support conveyor technique 32. The shipping support conveyor technique 32 is preferably connected to one or more shipping stations, as exemplarily indicated by an arrow 34. The shipping station or shipping stations is/are not shown in FIG. 1.

Figure 2:
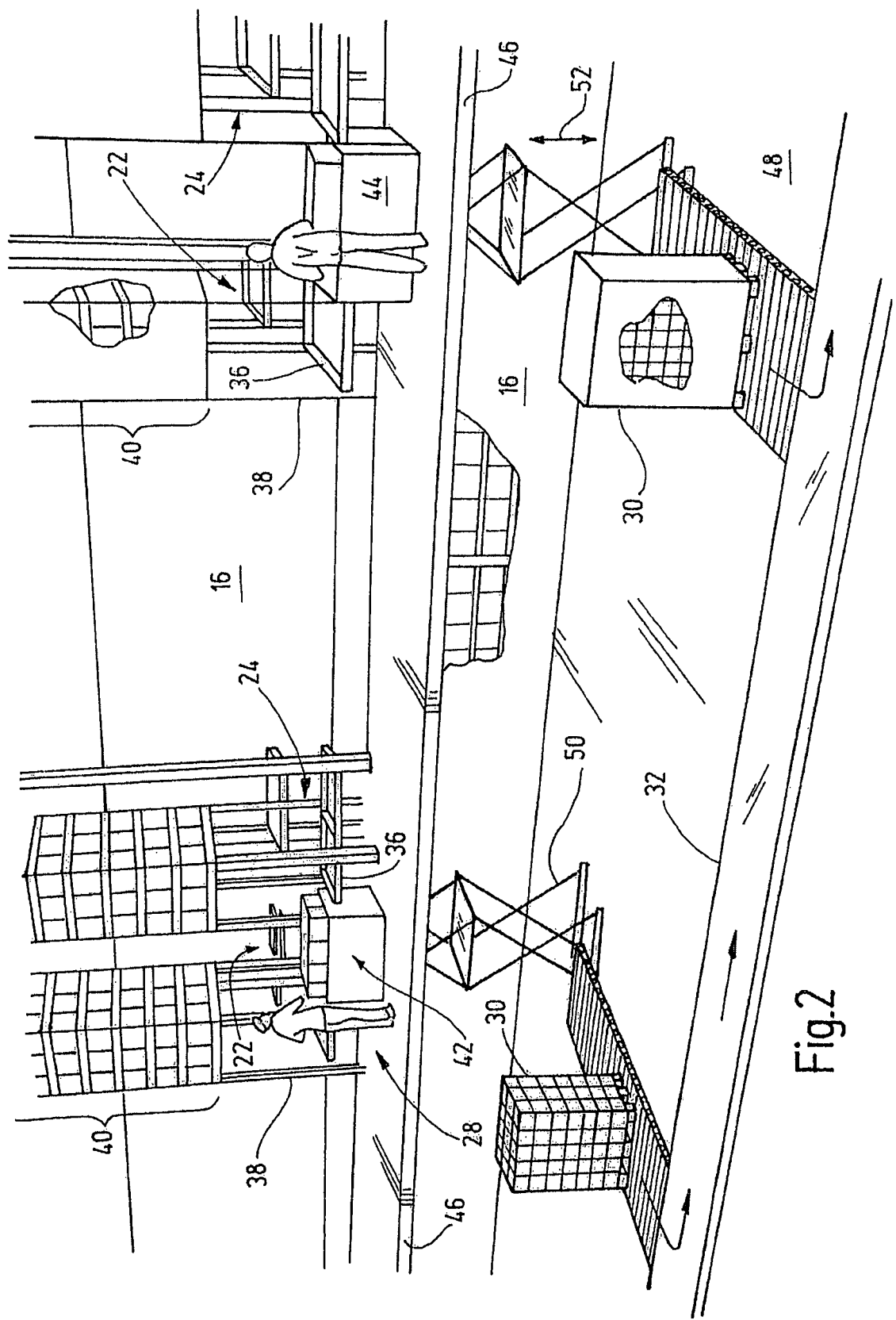
FIG. 2 shows a perspective view of two work stations in accordance with the present invention.

With reference to FIG. 2 two work stations 28, 28' of FIG. 1 are exemplarily shown which are arranged in the region of the second rack plane 16 which, in turn, is arranged above the lowermost rack plane 16 (cf. FIG. 1). The work stations 28, 28' respectively comprise a lift unit 20 assigned thereto which can comprise several lifts 22, 24. The lifts 22, 24 respectively comprise one or more LSD for retrieving load supports from transfer rack positions and, if necessary, giving back load supports to transfer rack positions. The work stations 28, 28' optionally comprise devices 36 for presenting load supports, wherein one device 36 for presenting load supports is assigned to each lift 22, 24, respectively.

The device 36 for presenting load supports (which are here not shown in FIG. 2) comprises an operational area which preferably is provided with lowered rollers in order to simplify the transfer of load supports. The operational area preferably can be tilted. For that purpose, a device (here not shown) for tilting the device 36 for presenting load supports is provided. The operational area can be tilted towards different directions.

In FIG. 2, the devices 36, which are respectively arranged in the left region of the work stations 28, 28', are tilted to the front, i.e. away from the longitudinal side of the rack towards an order picker. The device 36, however, can also be formed such that tilting towards another direction can be performed, as it will be explained in more detail below.

The device(s) 36 for presenting load supports is/are preferably integrated into a frame 38 of the rack type, preferably in grabbing height and within range of arms (serving height) of an order picker (who might stand or sit). Above the devices 36 for presenting load supports areas 40 for providing additional rack positions can be arranged respectively. In these areas 40 load supports can be stored, which carry often required articles ("A" articles, fast-moving items or fast movers).

At each of the working stations 28, 28' a packing station 42 is arranged between the devices 36 for presenting load supports, as shown in FIG. 2. The packing station 42 can comprise a frame 44 for assisting in packing processes.

The packing station 42 is arranged in an immediate area of the lift unit 20. The immediate area is defined in that an order picker does not need to move from a predetermined position at all, in order to pack articles from load supports onto a shipping support (not visible here). The immediate area is characterized in that no conveyor technique needs to be provided between the lifts 22, 24 and the packing station 42, in order to allow an exchange of load supports between the lift unit 20 and the packing station 42. The process of order-picking and packing also happens within the immediate area of the lift unit. Preferably, the device 36 for presenting can be omitted, and one can directly pick from the lift unit.

With the work stations 28, 28' depicted in FIG. 2 the packing station 42 respectively is arranged between the devices 38 for presenting load supports. For allowing work stations (not shown) which do not comprise devices 36 for presenting load supports, the packing station might also be arranged directly between the lifts 22, 24 of the lift unit 20, in order to pack articles to be picked directly from the lift onto the shipping support. In this instance, the packing station abuts directly on the longitudinal side of the rack.

The width and depth of the lifts 22, 24 as well as the devices 36 for presenting load supports, and particularly of the packing station 42, is in the order of the dimension of a load support or shipping support. The dimensions of a load support and shipping support are almost identical, particularly if, for example, EuroPallets are used as shipping supports and articles are stored in a layerwise manner on the load supports, which have been de-palletized in layerwise manner from good receipt EuroPallets onto the load supports.

The lifts 22, 24, the devices 36 for presenting load supports as well as the packing station 42 are arranged with respect to each other such that a transfer of a load support between these components can be performed directly, i.e. without interconnecting an additional conveyor technique. The same applies with respect to the transfer of a load support between the lifts 22, 24 and the rack 12 (cf. FIG. 1).

It is clear that a work station in accordance with the present invention can also comprise only one lift and one packing station, wherein preferably a device for presenting load supports is coupled therebetween.

The packing station 42, in FIG. 2, is arranged at a level of the second rack plane 16 on the order-picking plane 46. Beneath this, an additional level 48 is shown in the height of the lowermost rack plane 16. Preferably, the shipping support conveyor technique 32 is arranged at the level 48.

The packing station 42 and the work station 28, respectively, further comprise a lifting device 50, which, in turn, is arranged on the level 48 arranged below. The lifting device 50 can be lifted and lowered in a vertical direction along an arrow 52. By the aid of the lifting device 50 a shipping support to be packed is lowered about a packing layer as soon as an order picker has packed a layer of the shipping support with articles. Particularly, beneath the plane 46 is provided a wrapping device (here not shown) by which packing layers already packed on the shipping support (and already correspondingly lowered) can be wrapped, for example, with a thermoplastic foil and be welded for avoiding getting off place or collapsing of the packed stacks of goods.

Figure 3:
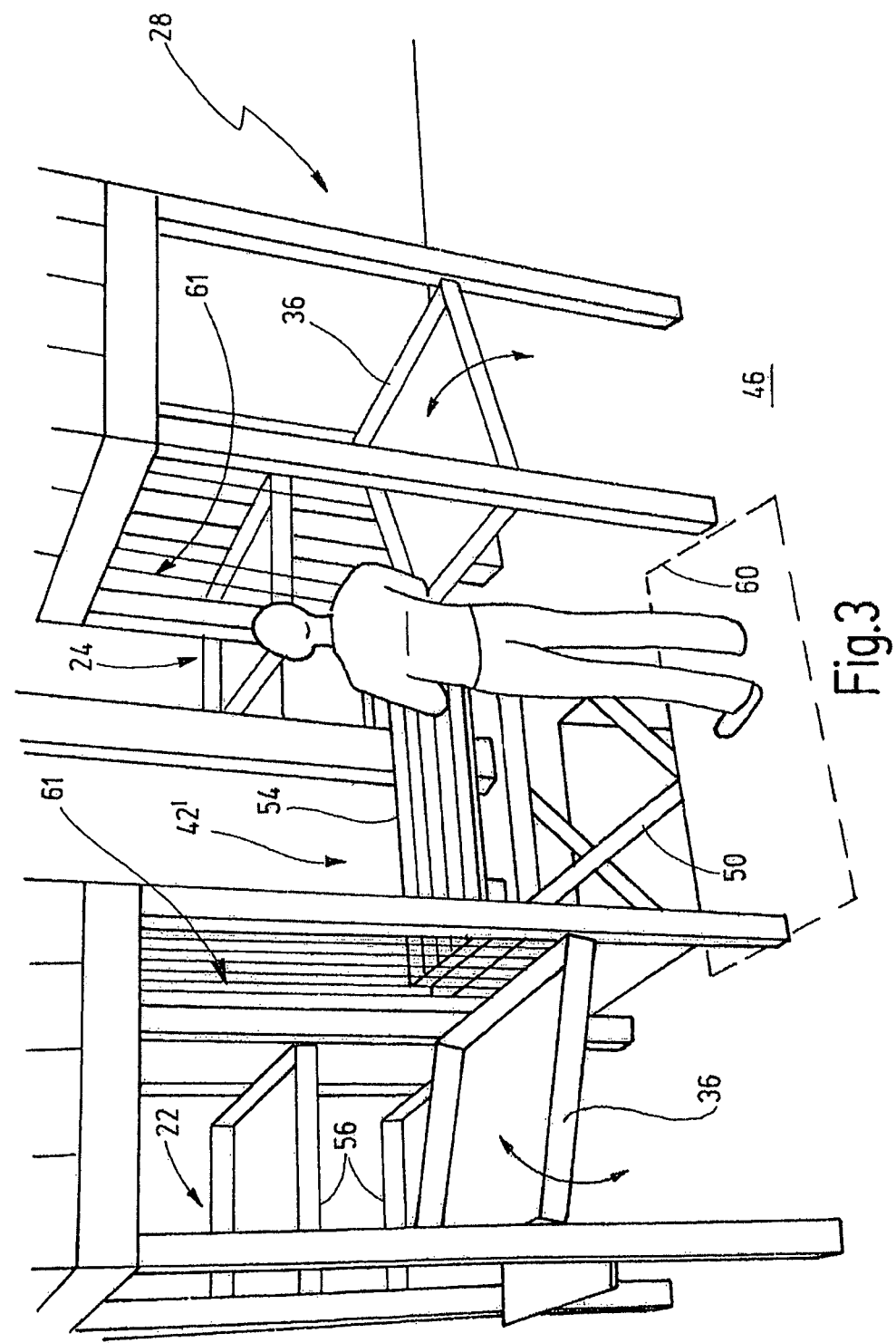
FIG. 3 shows another work station in accordance with the invention in a perspective view.

With reference to FIG. 3 another embodiment of a work station 28 in accordance with the present invention is shown, the work station being similarly assembled as the work stations 28, 28' shown in FIG. 2.

The work station 28 of FIG. 3 distinguishes from the work stations 28 or 28' of FIG. 2 in that here no frame 44 for assisting the packaging process is shown for illustration purposes. The LSD 76 of the lifts 22 and 24 are clearly shown in FIG. 3. The devices 36 for presenting load supports are tilted towards the packing station 42' (without frame 44) such that an order picker 58 only has to move into an order-picking area 60, in order to move or shift units to be picked towards the shipping support 54.

The devices 36 as well as the shipping support 54 are preferably arranged in hip height of the order picker 58 so that the order picker 58 does not have to stoop or stretch when transferring the articles to be picked onto the shipping support 54. This increases the ergonomics of the work station. Also, the spatial limitation of the order-picking area 60, which is indicated by a broken line, increases the ergonomics.

The empty shipping support 54 (EuroPallet) shown in FIG. 3 can either be lifted by the aid of a lifting device 50 from the level 48 (here not depicted), which is located deeper, to the level 46 onto the work station 28. However, alternatively an empty shipping support 54 could be stored, for example, into the additional rack position 40 (cf. FIG. 2) and be retrieved from the associated lift 22 or 24 by means of the LSD 56 thereof, and be delivered to the device 36 which is tilted either—relatively to the packing station 42'—by lifting the exterior or lowering the inner side of the area of the device 36 for representing load supports or shipping supports. Then, the order picker 58 can easily pull the empty shipping support 54 onto the lifting device 50. For that purpose, preferably a mechanism (not depicted) is provided which supports the transfer process by means of a support force upon activation by the order picker 58.

For operational safety reasons as well as monitoring (access, delivery) and for confirming (counting) transfer processes between the LSD 56, the devices 36 and the lifting devices 50, sensors such as light grids 60, 61' can be provided at locations of corresponding transfers.

The light grid 61 allows monitoring of transfers between the device 36 for presenting load supports and the shipping support 54, or the lifting device 50. The light grid 61 preferably serves for confirming an order-picking process, i.e. for confirming removal of articles to be picked and/or delivery of these articles to the shipping support 54. The light grid 61' serves for acknowledging transfer processes between the lift 24 and the device 36 for presenting load supports. Further, the light grid 61, or the signals produced thereby, can be used for prohibiting a transfer of load supports, if the order picker 58 has his/her arms and/or hands within the region of the device 36. In this manner, injuries of the order picker 58 can be prevented if load supports are accidentally transferred, since the transfer, as a rule, happens automated. If the lift unit comprises several lifts, it can be monitored whether removal happens from the "correct" lift. For that purpose, a display can be provided as well, which indicates the number of articles to be picked as well as the lift from which articles have to be picked.

Figure 4:
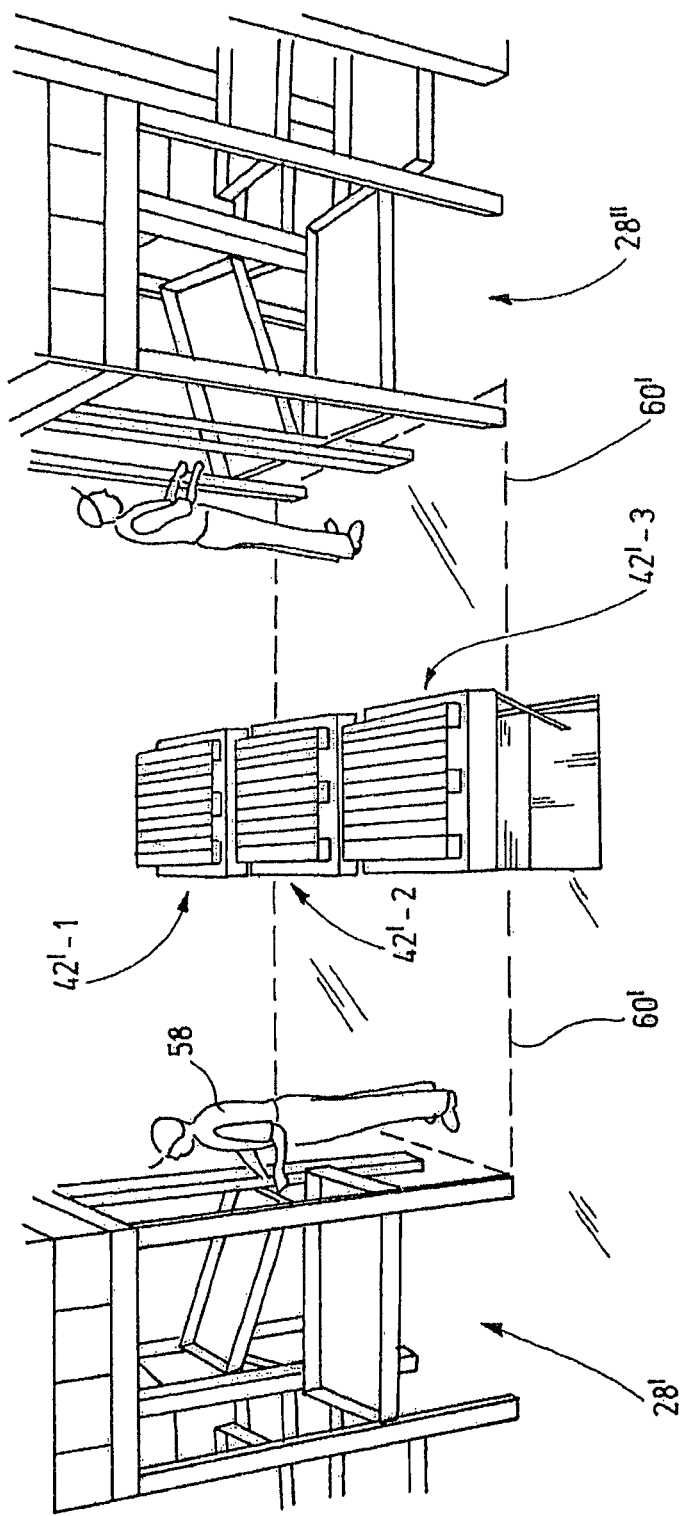
FIG. 4 shows a perspective view of another embodiment of a work station in accordance with the invention.

With reference to FIG. 4 another embodiment of a work station 28" is illustrated.

The work station 28" comprises at least one packing station. In the example of FIG. 4 three packing stations 42'-1, 42'-2 and 42'-3 are depicted. The packing stations 42' are arranged in a displaced manner in comparison to the work station of FIG. 3. The work station 42' of FIG. 4 is arranged oppositely relative to its lift units and, respectively, to the devices for presenting load supports.

Two racks or rack blocks (cf. FIG. 1) at the work station 28' are arranged such close to each other that two lateral lift units are arranged immediately oppositely to each other. Here, the work station 28" is served by two order pickers 58, wherein each of the order pickers 58 is supplied by another lift unit which retrieves articles to be picked respectively from another rack.

The order-picking areas 60' define the areas within which the order pickers 58 move, in order to pack articles to be picked onto the load supports 54.

Based on FIG. 4 the following features can be recognized, which can be modified with a work station according to the present invention as well: the spatial arrangement of the packing station relatively to the associated lift unit; the size of the order-picking area 60; the number of packing stations; and the possibility of supplying the same packing station(s) with articles to be picked by means of several order pickers and lift units.

Figure 5:
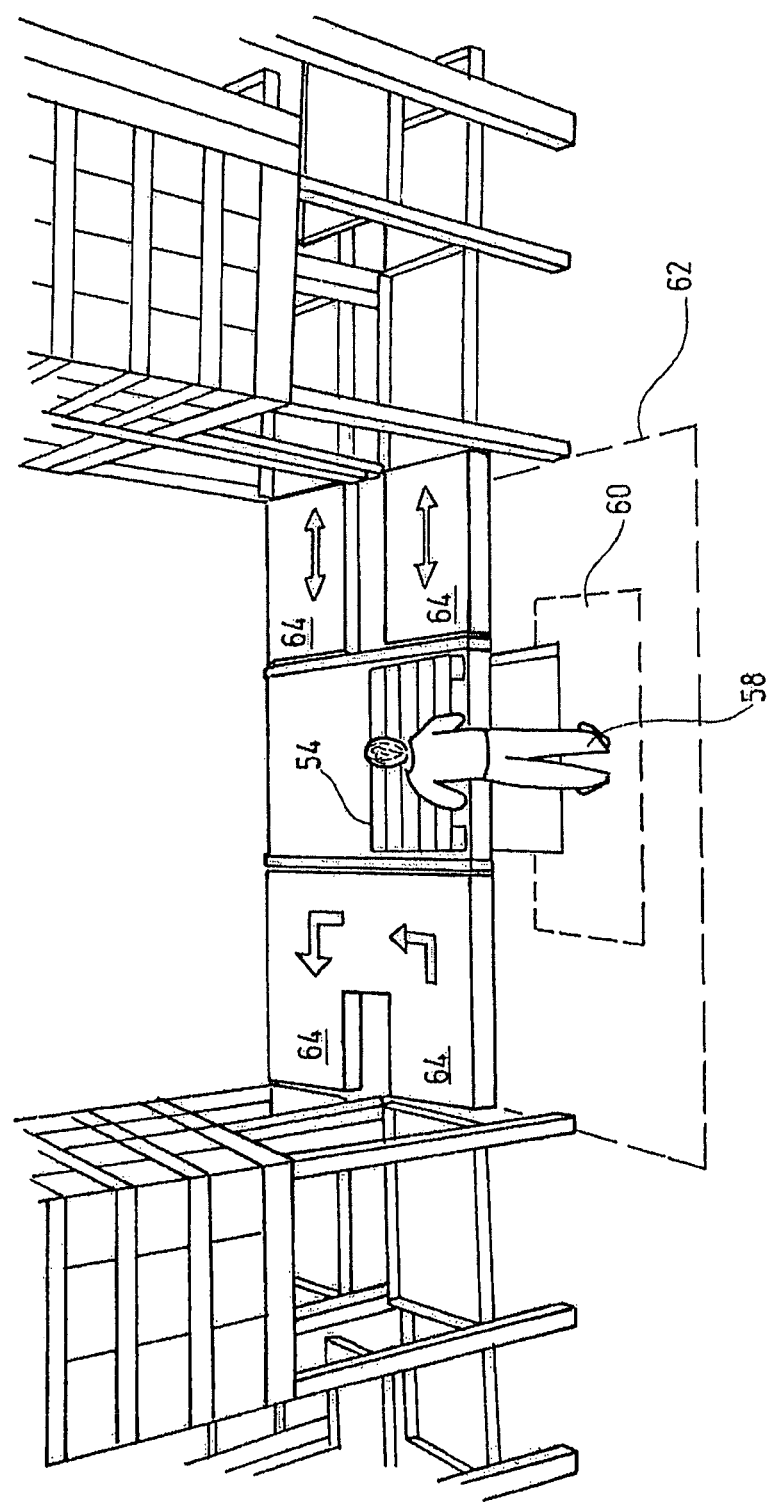
FIG. 5 shows still another embodiment of a work station in accordance with the present invention.

FIG. 5 shows a modification of the work station 28" of FIG. 4.

With the embodiment of the work station of FIG. 5 one or more packing stations are supplied with articles to be picked, or load supports by means of several lift units which respectively can be assigned to another rack. The work station is arranged centrally between the longitudinal sides of the racks.

The work station shown in FIG. 5 is characterized in that here only one order picker 58 within the order-picking area 60 has to be supplied with articles or load supports from two different lift units. Two order pickers might stand oppositely to each other, each of whom packs onto a shipping support, which is assigned to the respective order picker. Here, exemplarily the immediate area, within which the work station is arranged relatively to the lift units, is designated by reference numeral 62 and surrounded by a broken line. Additional (short) conveyor techniques such as conveyor belts are provided between the packing station of FIG. 5 and the lifting units, in order to transport articles from the lifting units to the packing station. However, the conveyor techniques 64 could be omitted as well. In this instance, the order-picking area 60 of the order picker 58 were expanded to the immediate area 62. The order picker 58 would have to take the articles to be picked, thus, "on foot" from the lift units to the packing station. Alternatively, the rack units, however, could be relatively arranged closer to each other as well.

In the top view, each lift has about the area of one rack position. The same applies with respect to the packing station. The immediate area, within which the packing station is relatively arranged to the lift unit, preferably is not greater than some few rack position areas (e.g. 0-4).

FIG. 5, in this sense, shows two work stations arranged parallelly with respect to each other (horizontally within the drawing plane), wherein no corresponding order picker is depicted at the second work station (in the back).

The conveyor techniques 64, on the left-hand side relative to the shown order picker, and the conveyor techniques 64 arranged at the right-hand side relatively thereto, also could, however, respectively be connected to form a loop so that one of the lifts of the associated lift unit takes over the supply with load supports from the rack, while the associated other lift takes care for the transport. A packing station formed in this manner has the additional advantage that load supports can be supplied parallely to the order picker from two sides (racks). This is expressed in low sequencing requirements for the machines of each rack, and results in a higher flexibility with respect to the coordination of the load support flow from and to the packing station.

Further, only one packing station might be arranged centrally between the conveyor techniques 64 (not shown), wherein two order pickers could also pack on one and the same shipping support.

Figure 6:
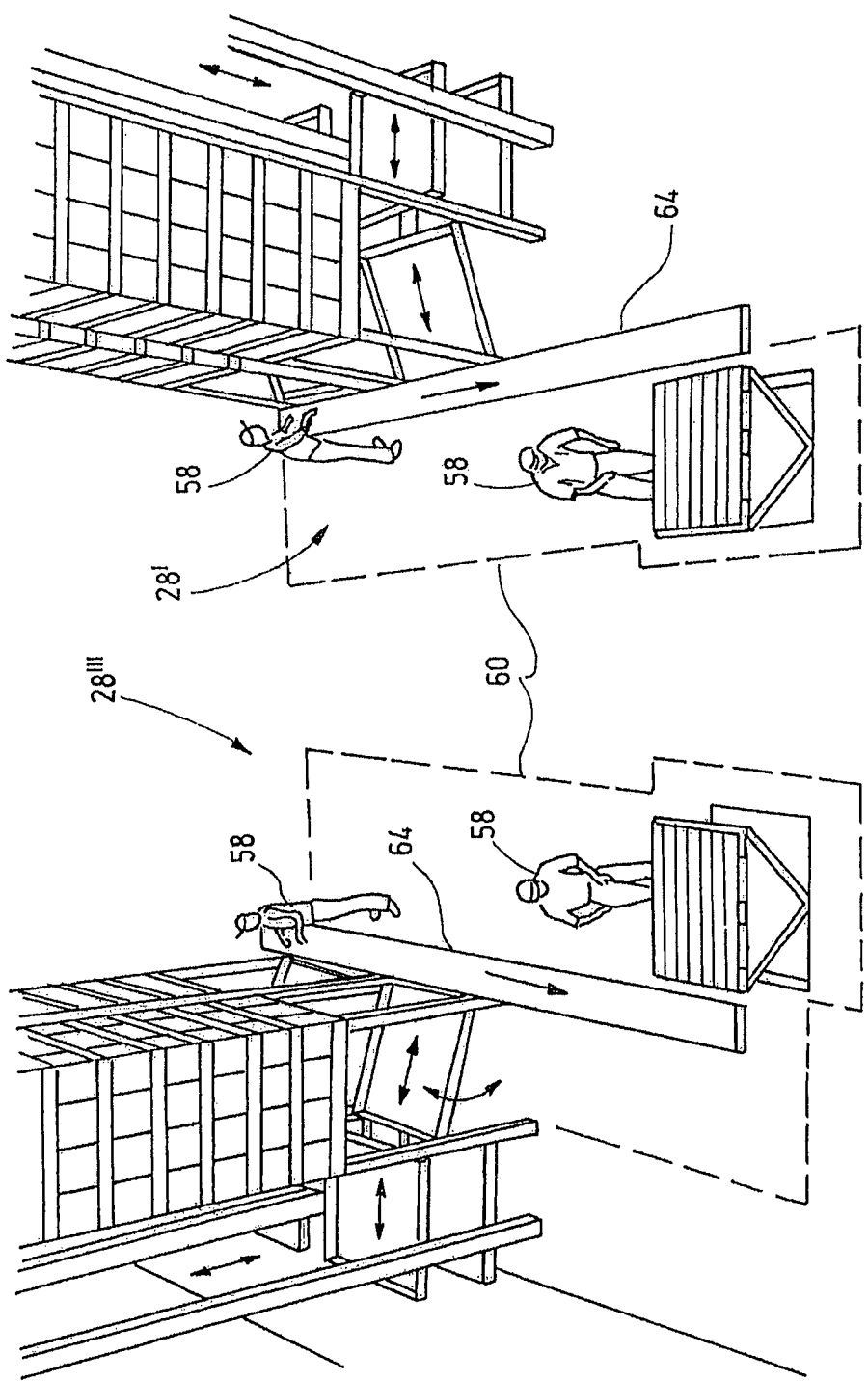
FIG. 6 shows still another embodiment of a work station in accordance with the present invention.

With the embodiment having two lifting devices (cf. FIG. 5) empty shipping supports 54 could be served from one of the lifting devices, while the other lifting device lowers a packed shipping support for transport. For that purpose, it would be advantageous, if one of the lifting devices delivers the empty shipping support to an interim storage device (not shown) which holds the shipping support to be packed at the serving level of the order picker until the other lifting device is driven up again for taking over this shipping support. FIG. 6 shows another embodiment of a work station 28''' in accordance with the present invention.

The work station 28''' of FIG. 6 is formed in a two-stage manner, and is respectively operated by two persons 58, who can move within the assigned order-picking area 60. The order-picking station 28''' also comprises a conveyor technique 64, in order to convey articles or load supports from the lift unit, where the (first) order picker 58 works, to the packing station, where the (second) packer works.

The arrangement shown in FIG. 6 has the advantage that for safety reasons mandatory escape ways remain open to people. Further, the processing speed can be increased since one person picks (takes), while the other person packs.

Also, very huge load supports such as trays with dimensions of 1300×1300 can be handled easily and good at such a work station. The persons do not need to stretch extraordinarily, in order to get to the packing units which, possibly, are arranged in an area of the load support which might be accessible badly. The packer can walk around the shipping support to be packed, and thus has access from all sides. The same applies with respect to the accessibility of the load support.

Further, the frame 44 (cf., e.g., FIG. 2) can comprise a circumferentially oriented horizontal manipulation area (not shown), on which the packer pushes or pulls shipping units to be packed, for example, around the shipping support.

Even further, the packer and the order picker can alternate (ergonomics/job rotation). They also can assist each other mutually.

It is clear that the shown persons might be replaced by corresponding robots as well. Additionally, other assistance devices such as vacuum grabbing devices could be used for lifting and moving heavy items.

Figure 7:
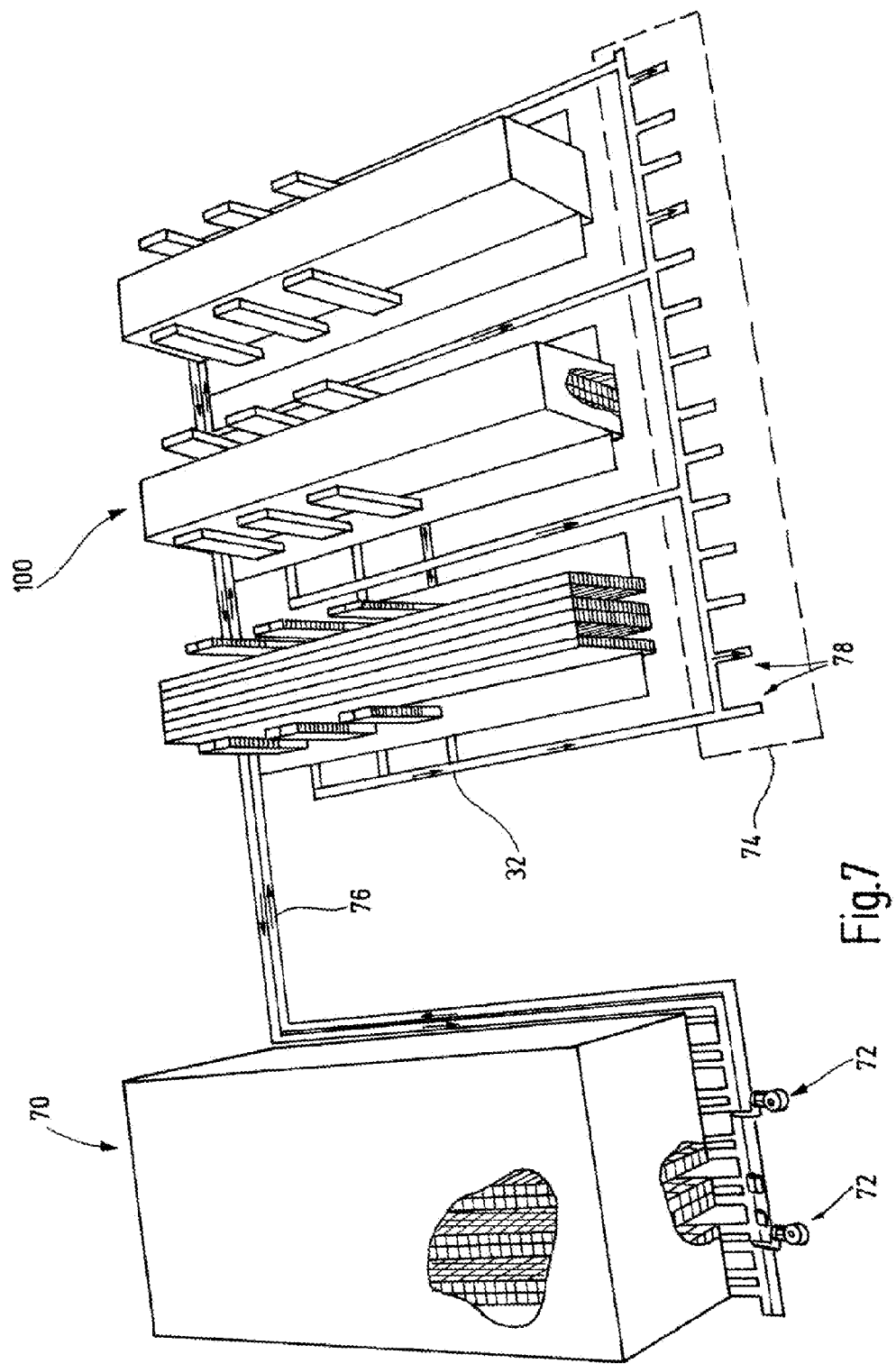
FIG. 7 shows a perspective view of another order-picking system using work stations in accordance with the present invention.

FIG. 7 shows a schematic perspective top view of an entire order-picking system into which work stations in accordance with the present invention are integrated. The entire order-picking system exemplarily comprises one high-bay warehouse 70 having de-palletizing devices 72, one rack warehouse area 100 (cf. FIG. 1) and one shipping area 74 connected thereto.

The rack warehouse 100 is connected to the high-bay warehouse 70 via a conveyor technique 76 (cf. reference numeral 26 in FIG. 1), in order to store articles, preferably on load supports. Within the high-bay warehouse 70 pallets are stored, which are preferably loaded completely with articles of one sort only, the pallets being de-palletized in the rack warehouse 100, as required, preferably onto trays in a layer-wise manner.

The order-picking and packing, i.e. the processing of an order-picking order, then happens within the rack warehouse, wherein the work stations are integrated into the racks, as explained in detail above. Shipping supports completely loaded are then transported via the conveyor technique 32 into the shipping area 74 (cf. arrow 34 in FIG. 1) to a plurality of shipping stations 78.

An order-picking system, designed in this manner, allows heavy reduction of the required conveyor technique. The conveyor technique is substantially limited to a goods receipt conveyor technique and a shipping support conveyor technique. The track routing as well as the control can be significantly simplified. Further, a one-stop strategy or a multiple-stop strategy for the shipping supports is possible. Order-picking orders can be processed in a parallel or serial manner at different work stations.

The work stations in accordance with the present invention allow significant reduction of the required area, resulting in a significant gain of area as well as remarkable reduction of investment costs (building estate).

It is clear that the work station in accordance with the present invention can further be used with a plurality of different rack types, since in this term it is formed modular and scaleable.

Figure 8:
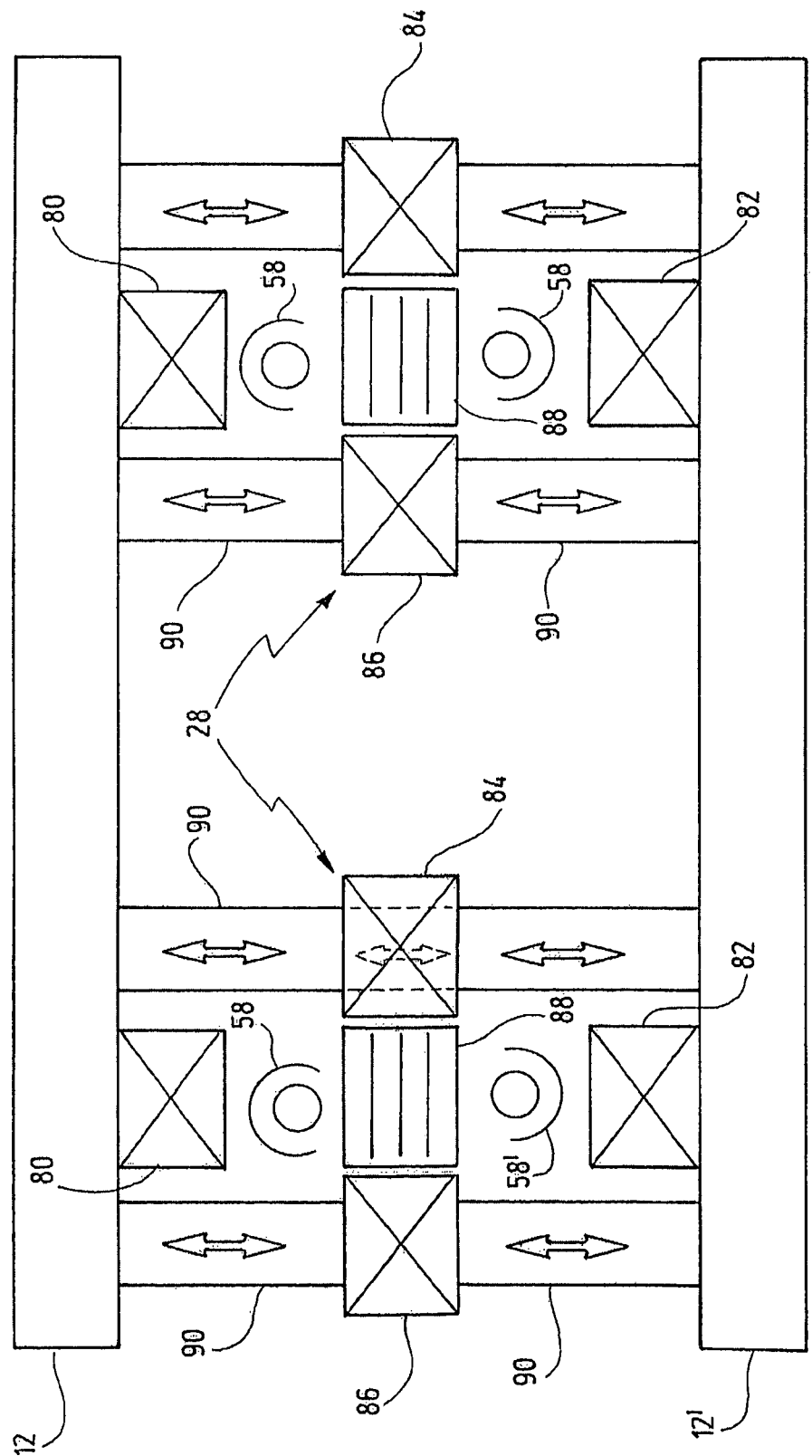
FIG. 8 shows a schematic top view of other work stations in accordance with the present invention.

FIG. 8 shows a schematic top view of another warehouse, wherein two additional work stations 28 in accordance with the present invention are shown. Since the work stations shown in FIG. 8 are identical, hereinafter only one of the work stations of FIG. 8 will be explained in more detail.

A work station 28 of FIG. 8 comprises several lifts, which are assigned thereto and supply load supports thereto. Four lifts 80, 82, 84 and 86 are utilized in FIG. 8. It is clear that more or less lifts for each work station can be employed.

The four lifts 80-86 of FIG. 8 are arranged in horizontal and vertical directions around a packing station 88. The first lift 80 retrieves load supports preferably from a first rack 12 and supplies the same to a first order picker 58. The second lift retrieves load supports preferably from a second rack 12' for supplying the same to a second order picker 58', who stands oppositely to the first order picker 58 and packs articles from the opposite side of the packing station 88 onto a shipping support. Both the third lift 64 and the forth lift 86 are coupled to the first rack 12 and the second rack 12', respectively by means of conveyor techniques 90. Load supports can also be exchanged between the racks 12 and 12' via this way, without actually having to pass the order pickers 58, 58'. Particularly, there might exist direct connections (i.e. without a lift connected therebetween) between the racks 12, 12', for changing, if necessary, the distribution of articles in the racks.

If two order pickers 58, 58' work at the work station 28 of FIG. 8, they can also pack huger pallets (1000×1200 or bigger) without problems in a common and ergonomical manner.

For increasing the accessibility of the packing station 88, the lifts 84 and 86 can also be distanced farther away from the packing station 88.

The third lift 84 and the forth lift 86 are arranged within the rack aisle. They can be supplied with load supports from both racks. The load supports can be tilted towards the packing station 88 at the foot of the lift, i.e. at packing station level, for facilitating pulling thereof. These two lifts 84,86 can be served from both of the order pickers 58, 58'. One of the lifts 84, 86 can also be used for serving empty pallets. For that purpose, the work stations 28 are preferably located at a higher level. Beneath this level, the lifts 84, 86 are supplied with empty pallets, for example, by means of fork lifts. The fork lifts can also be used for the transport of completely packed pallets. The lifts 80-86 preferably reach to a level of the fork lift. This results in shorter pallet exchange times.

By this arrangement of four lifts around a packing station, the double amount of articles, in comparison to the work station of FIG. 2, can be transported to the packing station in the same time.

Further, labeling of the shipping support is possible at the work stations. Light grids increase the safety. Safety turn-offs for pallet and load support exchanges can be provided. Shipping supports can be processed parallelly or serially. Multiple-stop strategies can be performed with the shipping supports.

I claim:

1. A work station for order-picking and simultaneously packing articles onto a shipping support, comprising:
   at least one rack which is divided into at least one rack plane wherein the at least one rack plane comprises a plurality of rack positions in more than one horizontal row and more than one vertical column to define a rectangular array of rack positions for storing load supports, wherein the articles to be picked are stored in or on the load supports in the rack positions,
   at least one storage machine coupled to a first longitudinal side of the at least one rack, the storage machine being movable vertically and horizontally along the first longitudinal side for transporting the load supports between the rack positions of the rectangular array;
   at least one packing station for packing articles onto the shipping support; and
   at least one vertical lift unit between the at least one packing station and the at least one rack wherein the at least one vertical lift unit abuts a second longitudinal side of the at least one rack and is adapted to retrieve the load supports only from such rack positions which are located in a single vertical column directly adjacent to the at least one vertical lift unit.

2. The work station of claim 1, further comprising a device for presenting load supports, which is arranged such that load supports can be delivered from the lift unit to the device for presenting the load supports.

3. The work station of claim 2, wherein the device for presenting the load supports is integrated into a frame of a rack type, wherein the frame comprises additional rack positions for storing load supports at least one of above and beneath the device for presenting.

4. The work station of claim 2, wherein the device for presenting the load supports tilts along a horizontal axis for presenting the load supports towards the packing station.

5. The work station of claim 1, wherein the lift unit comprises at least a lift movable in vertical direction, which comprises a load suspension device for retrieving and delivering load supports at least of one from or to a rack position, and from or to the packing station arranged adjacently to the lift.

6. The work station of claim 5, wherein the at least one lift unit comprises at least two lifts separately movable into the vertical direction.

7. The work station of claim 6, wherein the packing station is arranged in an area between two neighboring devices for presenting load supports, each of which is assigned to another one of the lifts.

8. The work station of claim 1, comprising a further rack also having a laterally arranged further lift unit, wherein the further rack is arranged oppositely to the rack so that the packing station is located within the immediate area of both the lift unit of the rack and the further lift unit of the further rack.

9. The work station claim 1, wherein the packing station comprises a frame for assisting a packing process.

10. The work station of claim 1, wherein the packing station comprises a lifting device for lifting the shipping support at an operational level, and lowering at a shipping level.

11. The work station of claim 1, wherein the packing station is arranged at a predetermined level, which has a height of the at least one rack plane.

12. The work station of claim 1, wherein the packing station is coupled to the lift unit by means of a conveyor.

13. The work station of claim 1, wherein the shipping support is a pallet.

14. The work station of claim 1, further comprising a shipping support conveyor for transporting packed shipping supports.

15. The work station of claim 1, wherein the second longitudinal side of the at least one rack is opposing the first longitudinal side of the at least one rack.

16. The work station of claim 1, wherein the storage machine comprises a rack feeder moveable in a horizontal and vertical direction.

* * * * *